UNITED STATES PATENT OFFICE.

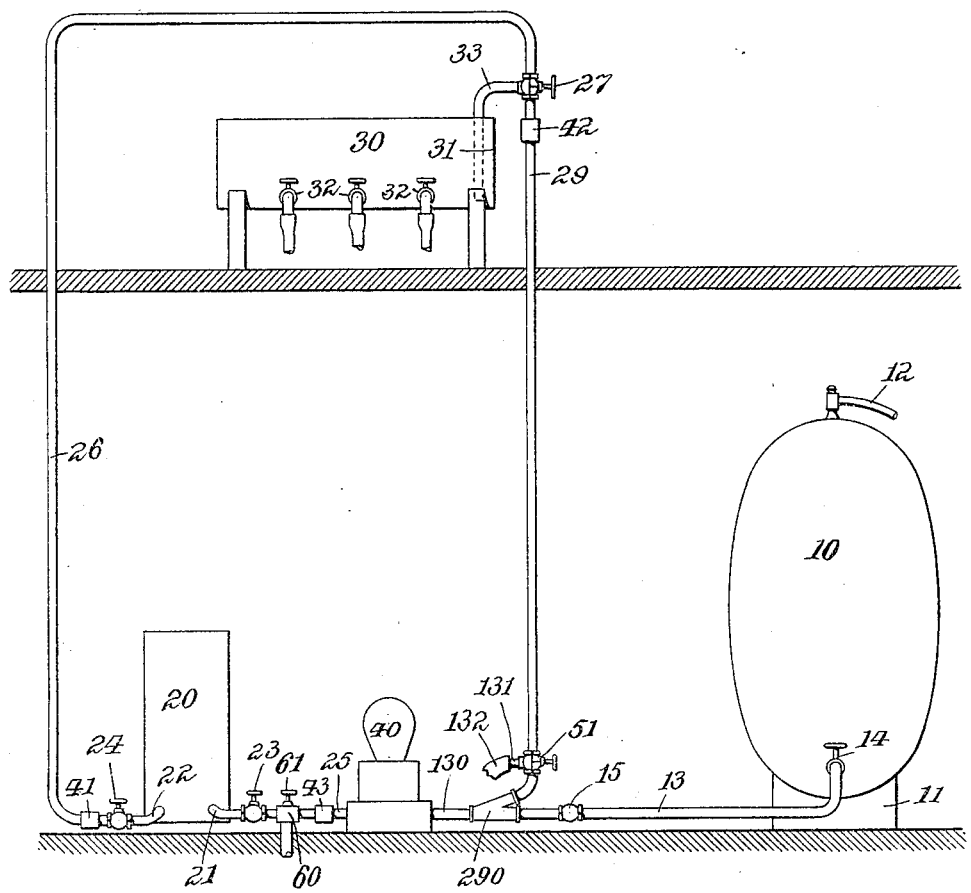

MAX STAHL, OF CHICAGO, ILLINOIS, ASSIGNOR TO CHARLES H. LOEW, OF LAKEWOOD, OHIO.

CIRCULATING SYSTEM FOR BEER-FILTERS.

No. 812,243.　　　　　Specification of Letters Patent.　　　　　Patented Feb. 13, 1906.

Application filed March 18, 1905. Renewed December 21, 1905. Serial No. 292,739.

*To all whom it may concern:*

Be it known that I, MAX STAHL, a citizen of the United States, residing at Chicago, in the county of Cook and State of Illinois, have invented certain new and useful Improvements in Circulating Systems for Beer-Filters, of which the following is a specification.

My invention relates to a circulating system for beer-filters, and its novelty consists in the construction and adaptation of the parts, as will be more fully hereinafter pointed out.

In the filtration of beer it is usual to employ a filter containing a plurality of layers of a suitable filtering medium, such as wood-pulp, and provided with suitable inlet and outlet liquid-conductors. The beer is forced from the chip cask by air-pressure put upon the cask. It flows through a hose to the filter, is forced through the filter, and through another hose to the racking apparatus. This racking apparatus comprises one or more discharge-faucets controlled by valves and arranged upon a framework on which the packages to be filled with the beer are supported while the racking off or filling operation is going on. Beneath the packages and sometimes comprising part of the framework is a trough or receptacle, which is adapted to receive any beer overflowing from the packages or dripping from the faucets and which is called in the trade the "brink." When the filter has been packed, it is usual to fill and force water through the filter for a time in order to wash away the minute particles of the filter mass which cling to the walls and screens between the filtering-chambers caused by the pressure exerted through packing and to establish normal relations between the parts. The current of water is then cut off and the beer turned on, a back pressure being kept upon the filter and upon the hose to the racking-bench in order to prevent foaming. Of course it will not do to put beer into packages for sale until it runs from the racking-bench free from water and cleared of the finer particles of filter mass and is therefore allowed to run into the brink until this is accomplished. Moreover, in using a filter it is necessary at times to stop its working. This occurs at noon, at night, and at other times when the racking-off operation is suspended. When the racking-off and filtering operation is resumed after such suspension, the beer usually runs turbid for a time and is run into the brink at the racking-bench and is unsalable, although it is frequently retained for consumption by the brewery employees.

My invention aims to and does overcome the losses and disadvantages referred to, and in brief it consists of providing means whereby the column of beer can be switched off the racking-bench and continuously returned to the filter until stable relations are secured and the beer no longer runs cloudy or contains fibers of filter mass.

In the drawing there is shown a diagrammatic representation of a filtering apparatus and connections supplied with my improvement.

In the drawing, 10 is a chip cask suitably supported on a base 11, provided with a valve-controlled hose 12, leading from a source of air under pressure (not shown) and provided with a second hose 13, leading to a pressure-regulating pump 40 and provided with a valve 14 at the chip cask and a check-valve 15, the purpose of which will presently appear.

20 represents a filter of any approved form or construction and provided with an inlet-pipe 21 for the unfiltered beer and an outlet-pipe 22 for the filtered beer. These pipes are controlled by the valves 23 and 24, respectively.

30 is the racking apparatus, comprising an equalizing pressure-tank 31 and one or more racking-taps 32 32 32. The racking apparatus, however, may be of any suitable form or construction properly adapted to the purpose for which it is designed to be used.

40 is a pressure-regulating pump connected on the one side with the hose 130, leading toward the chip cask, and on the other side to the hose 25, leading to the inlet of the filter.

26 is a hose leading from the outlet side of the filter to the racking-bench and is provided with a three-way cock 27, whereby the column of beer can be turned into the racking apparatus 30 through the branch pipe 33 leading thereto or can be shut off entirely or can be turned into the pipe 29, leading downward into the Y-coupling 290, connected, as shown, to the pressure-regulating pump's inlet.

41 is a sight-glass let into the pipe 26. 42 is a similar sight-glass let into the pipe 29, and 43 is a sight-glass let into the pipe 25.

290 is a Y-coupling connecting the pipes 29, 130, and 13, and 51 is a three-way cock let into the pipe 29 at its connection with the Y-coupling 290 and connected also to a pipe 131, to which may be attached a hose 132.

60 is a discharge-pipe and is controlled by a valve 61.

When the racking operation is about to begin for the first time after the filter has been packed, the mode of operation of the device is as follows: The cock 61 is opened, the three-way cock 27 is closed to the racking apparatus, and three-way cock 51 is closed to the pump. The filter 20 having previously been filled with water, the air-pressure is put on the cask 10 through the hose 12, the cock 14 is then opened, and the pressure-regulating pump 40 is set in operation. After the air in the line of hose 13, the pump 40, and the hose 25 is expelled through the pipe 60 the cock 61 is closed and the cocks 23 and 24 are opened. The check-valve 15 is also closed to the cask 10 to prevent back jars from the pump to the cask when the circulating system is in operation, and it automatically opens when the beer is turned into the racker from the three-way cock 27. The air-pressure upon the chip cask being continued, the column of beer begins to flow against the body of water in the filter and is thus forced through the pipes 26 and 29 and out through the pipe 131 and hose 132. After the water is all expelled through the pipe 131, which can be observed by means of the sight-glass 42, the three-way cock 51 is opened to the pump 40. This closes it to the pipe 131, and the beer is thus forced back into the filter through the coupling 290 and pipe 130 and allowed to circulate until it shows clear in the sight-glass 42, when normal conditions are established. The three-way cock 27 is now opened to the racking apparatus and the racking operation begins.

It will be understood that by the above-described continuous circulation particles of filter mass or the material causing turbidity in the beer will be carried around from the outlet to the inlet side of the filter, where they are retained by the filter mass.

If the filtering operation is stopped for a time—such as at noon hours, &c., as stated above—the beer will run cloudy for some time after the filtering operation is again resumed. In such cases the device is used as follows: The air-pressure is put on cask 10 by means of the hose 12, the pump 40 is set in operation, the valves 23 and 24 are opened, and the valve 27 is closed to the racker and the valve 51 opened to the pump. The beer thus circulates from the pump to and through the filter and through the pipes 26 and 29 back to the pump and filter again until the normal condition of the beer is established. The cock 27 is then opened to the racker, which closes it to the pipe 29, and the racking operation is begun.

What I claim as new is—

1. The combination with a beer-filter, a source of beer-supply under pressure and a suitable conduit leading therefrom to the filter, of means intermediate the source of supply and the filter whereby the column of fluid is kept supplied to the filter when the source of supply is cut off.

2. The combination with a beer-filter, a source of beer-supply under pressure and a suitable conduit leading therefrom to the filter, of means intermediate the source of supply and the filter whereby the column of fluid is kept supplied to the beer-filter when the source of supply is cut off, comprising a pump and connections between the same and the outlet and inlet of the filter.

3. The combination of a chip cask, a beer-filter and a racking apparatus with a pump a conduit leading thereto from the racking apparatus and a connection between the pump and the filter.

4. The combination of a chip cask, a beer-filter, a conduit between them, a pump a conduit from the outlet of the filter to the inlet of the pump means for connecting the outlet of the pump to the conduit leading from the chip cask to the filter and means for shutting off the beer from the chip cask.

5. The combination of a chip cask, a beer-filter, a racking apparatus and conduits between the chip cask and the filter and the racking apparatus and the filter, with a conduit leading from the racking apparatus to the filter, a pump in the line of said conduit and suitable valves whereby the supply of beer is cut off from the chip cask and the racking apparatus and caused to pass through the pump in a circulating current.

In testimony whereof I affix my signature in presence of two witnesses.

MAX STAHL.

Witnesses:
 THOMAS J. McGUIRE,
 THOMAS A. BRICE.